(12) United States Patent
Aoki et al.

(10) Patent No.: US 6,919,942 B2
(45) Date of Patent: Jul. 19, 2005

(54) DISPLAY APPARATUS

(75) Inventors: Hironori Aoki, Kikuchi-gun (JP);
Shigeaki Noumi, Kikuchi-gun (JP);
Takafumi Hashiguchi, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 151 days.

(21) Appl. No.: 10/237,025

(22) Filed: Sep. 9, 2002

(65) Prior Publication Data

US 2003/0178628 A1 Sep. 25, 2003

(30) Foreign Application Priority Data

Mar. 19, 2002 (JP) ........................................ 2002-076221

(51) Int. Cl.$^7$ ............................................. G02F 1/1343
(52) U.S. Cl. ......................... 349/111; 349/140; 349/44
(58) Field of Search ............................ 349/140, 44, 111

(56) References Cited

U.S. PATENT DOCUMENTS

| | | | | | |
|---|---|---|---|---|---|
| 4,759,610 A | * | 7/1988 | Yanagisawa | ................ | 349/162 |
| 5,483,366 A | * | 1/1996 | Atherton | ...................... | 349/42 |
| 5,571,341 A | * | 11/1996 | Jackel | ........................ | 148/210 |
| 5,744,821 A | * | 4/1998 | Song | ............................. | 257/59 |
| 5,754,261 A | * | 5/1998 | Lyu | ............................... | 349/44 |
| 6,297,862 B1 | * | 10/2001 | Murade | ......................... | 349/44 |
| 6,352,911 B1 | | 3/2002 | Matsumoto | | |
| 6,525,787 B1 | * | 2/2003 | Sato | ............................. | 349/43 |
| 6,548,831 B1 | * | 4/2003 | Tokuhiro et al. | ............. | 257/72 |
| 6,639,281 B2 | * | 10/2003 | Kane et al. | .................. | 257/350 |
| 6,714,266 B1 | * | 3/2004 | Ueda et al. | .................. | 349/38 |

FOREIGN PATENT DOCUMENTS

| | | |
|---|---|---|
| JP | 60-207116 | 10/1985 |
| JP | 09-090409 | 4/1997 |

* cited by examiner

*Primary Examiner*—Kenneth Parker
(74) *Attorney, Agent, or Firm*—Oblon, Spivak, McClelland, Maier & Neustadt, P.C.

(57) ABSTRACT

A display apparatus according to the present invention is provided with a gate line 2 formed on an insulating substrate, a source line 13 intersecting with the gate line 2 with an insulating film in between, a source electrode 6 connected to the source line 13, a drain electrode 10 connected to a pixel electrode 9, a semiconductor layer 4 formed below the source electrode 6, the source line 13, and the drain electrode 10, a light-shielding pattern 12 configured below the semiconductor layer 4 lying below the source line 13, and a backlight emitting lights from a light source to the surface of the insulating substrate opposite to where pixels are formed. In this configuration, leakage current arisen in the semiconductor layer lying below the source line, the extending pattern of the drain electrode, and so on can be suppressed.

8 Claims, 7 Drawing Sheets

DISPLAY APPARATUS

BACKGROUND OF THE INVENTION

1. Field of the Invention

The present invention relates to a display apparatus having a thin film transistor (which will be referred to hereinafter as a TFT), for example, as a switching element, which is especially suitable for application to a liquid crystal display apparatus.

2. Related Background Art

A display apparatus using liquid crystal generally has a structure in which a displaying material such as liquid crystal is filled between two insulating substrates facing each other, and a voltage is selectively applied to the displaying material. At least one of the insulating substrates is a substrate on which a switching element such as a TFT and a pixel electrode connected to the switching element are formed, which will be referred to hereinbelow as an array substrate. On the array substrate, signal lines (source lines and gate lines) for transmitting signals to the switching element are formed like a matrix.

FIG. 11 shows a plan view of an array substrate in a conventional display apparatus, and FIG. 12 shows a cross-sectional view along line B—B in FIG. 11. In FIG. 11 and FIG. 12, a reference symbol 1 denotes an insulating substrate, 2 denotes a gate line, 3 denotes a gate insulating film, 4 denotes a semiconductor layer as a channel, 5 denotes an ohmic contact layer, 6 denotes a source electrode, 7 denotes a passivation film as an overcoating insulating film, 8 denotes a contact hole formed in an insulating layer, 9 denotes a pixel electrode, 10 denotes a drain electrode, 11 denotes an extending pattern of the drain electrode, and 13 denotes a source line. The substrate is formed as in the following.

First, a first conductive film is deposited on the insulating substrate 1. Next, the gate line 2 is formed by patterning in photoengraving and etching processes.

Then, the gate insulating layer 3 which is a first insulating layer, the non-doped semiconductor layer 4, and a doping semiconductor layer which will be the ohmic contact layer 5 are deposited successively. Further, a semiconductor pattern 4 and 5 which lie below a channel of a TFT and the source line 13, both of which will be formed later are configured by exposure and development of photoengraving processes and etching processes.

Then, a conductive layer such as Cr and Al is deposited, and by exposure and development of photoengraving processes and etching processes, the source line 13, the source electrode 6 of the TFT, the drain electrode 10, and the extending pattern 11 of the drain electrode are formed.

Furthermore, after depositing the passivation film 7 which is an insulating film such as SiN, exposure and development processes are carried out to form the contact hole 8 which is a continuity for a transparent conductive film which will be formed later, the source electrode 6, a drain electrode 10 pattern, and a gate line 2 pattern. The diameter of the contact hole 8 is preferably larger in order to reduce contact resistance.

Then, after the transparent conductive film such as ITO is deposited, the pixel electrode 9 is formed by exposure and development of photoengraving processes, and etching processes. By the above processes, a fabrication of the array substrate of a so-called bottom-gate type in which the semiconductor layer 4 is formed above the gate electrode is completed.

In the above processes, it is also possible to carry out exposure and development of photoengraving processes and etching processes after depositing the gate insulating layer 3 being the first insulating layer, the non-doped semiconductor layer 4, and the doping semiconductor layer which will be the ohmic contact layer 5, and further successively depositing conductive layers 6, 10, 11, and 13, which are Cr and Al, for example. In this way, formation of the source line 13, the source electrode 6 of the TFT, and the drain electrode 10 pattern, and formation of the semiconductor layer 4 pattern below those patterns can be done in one photoengraving process. In the array substrate fabricated in this procedure, the semiconductor layer 4 lies in nearly all the region below the conductive layer having the source electrode 6, the drain electrode 10, and so on.

In the array substrate fabricated in the process explained in the foregoing, the semiconductor layer 4 lies in all or part of the region below the source line 13, the source electrode 6 of the TFT, and the drain electrode 10. Especially, in the configuration where the semiconductor layer 4 lies in nearly all the region below the source electrode 6 and the drain electrode 10, the area becomes larger. When the etching quantity of a metal pattern forming the source electrode 6 and the drain electrode 10 is large, a pattern of the semiconductor layer 4 can project from a pattern of the source electrode 6 or of the drain electrode 10.

However, in the above-mentioned related art, when lights from a backlight come to the remaining semiconductor layer, electric charge is induced in the semiconductor layer. In this condition, the electric charge stored in the pixel electrode comes into the semiconductor layer (channel) of a TFT section through a carrier which is developed below the drain electrode. Further, when the lights from the backlight come to the semiconductor layer around a crossing point of the source line and the gate line, the electric charge (a carrier) in the semiconductor layer (a channel) of the TFT section flows into the source line through a carrier which is developed in the semiconductor layer below the source line. Due to the flowing out of the electric charge of the pixel electrode into the source line as described above, deterioration of display performance such as uneven brightness and/or reduced contrast occurs.

One solution for this problem is to shield the semiconductor layer below the drain electrode or the source line from lights with an extending pattern of the gate line or the gate electrode. This way, however, increases an overlapping area of the gate electrode or the gate line and the drain electrode, or of the gate line and the source line. Consequently, the capacity of the gate line and the source line becomes large; leading to significantly delay in the lines and greater pixel (drain) potential fluctuation generated in accordance with the gate electrode potential fluctuation, to cause the problem of noticeable uneven picture or screen flicker, which decreases picture quality. In the case of an array substrate in a display apparatus in which a semiconductor layer lies in all the region below a drain electrode, the area of a gate line and a gate electrode to shield the semiconductor layer from lights is still larger, which leads to more serious decrease in picture quality. A configuration for a different purpose from the present invention is disclosed in Japanese Patent Application Laid-Open No. S60-207116. FIG. 13A shows a plan view of a conventional array substrate in the above application, and FIG. 13B shows a sectional view of the same. In FIG. 13A and FIG. 13B, the same elements as in the FIG. 11 and FIG. 12 are denoted by the same reference symbols, and the reference symbol 21 denotes a light-shielding electrode, 22 denotes a thin film transistor, and 23 denotes a charge storage capacity. As shown in FIG. 13A and FIG. 13B, the charge storage capacity 23 is divided into several parts in the related art. Each of the divided charge storage capacity complements a mask mis-alignment in each other. Therefore, the total of the charge storage capacity is constant, and the area where the pixel electrode is covered by the light-shielding electrode is also constant. Accordingly, aperture ratio is constant as well, arising no unevenness of electric performance. As shown in FIG. 13B, the related art employs an array substrate of a so-called top-gate type in which the gate electrode 9 is arranged above the source electrode and the drain electrode. In this structure, since the semiconductor layer is arranged above the source electrode and the drain electrode, the problem caused by increase in leakage current due to lights from a backlight is not likely to occur, and because the light-shielding electrode 21 which doubles as a storage capacity line blocks lights at the base of the source line and so on, the capacity of the source line and the storage capacity line increases to cause delay in the lines, thereby decreasing picture quality. Also, when the source line and the storage capacity line are short-circuited due to contaminants produced during manufacturing processes and so on, picture problems such as line defects occur to lower manufacturing yield.

Another solution for the problems is disclosed in Japanese Patent Application Laid-Open No. H09-90409. FIG. 14 shows a sectional view of a conventional array substrate in the above application. In FIG. 14, the same elements as in the FIG. 11, FIG. 12, and FIG. 13 are denoted by the same reference symbols, and the reference symbol 24 denotes a light-shielding film, 25 denotes a polarizer, 26 denotes a backlight, 27 denotes an insulating layer, 28 denotes a first electrode layer, and 29 denotes a second electrode layer. As shown in FIG. 14, the light-shielding film 24 which is composed of a metal film is formed above the insulating substrate 1, and then the thin film transistor 22 is formed above the light-shielding film 24 in the related art. The light-shielding film 24 blocks lights from the backlight 26 to suppress the growth of leakage current. In the related art, however, while the leakage current from the semiconductor layer below the drain electrode can be suppressed, no measure was taken against electric charge flowing into the source line through a carrier developed in the semiconductor layer below the source line. Therefore, the electric charge coming into the source line causes the problem of decreasing picture quality. Also, since the light-shielding film 24 doubles as a gate electrode of the thin film transistor 22 in the related art, when the gate line (the light-shielding film 24) and another signal line are short-circuited due to contaminants produced during manufacturing processes and so on, picture problems such as line defects occur to lower manufacturing yield.

Further, when the semiconductor layer formed below the source line projects from the source line pattern due to the difference in etching quantity and so on, the part of the semiconductor layer which receives lights from the backlight becomes conductive. Therefore, the effective distance between the source line and the pixel electrode pattern becomes shorter, and a parasitic capacity between the lines increases. Further, the overlap width of the source line and an opposite electrode becomes effectively greater, and line loading capacity of the source line increases. Also, in a case where an extending pattern of the drain electrode is located near the source line or the gate line, when lights from the backlight come to the semiconductor layer lying below the pattern, the capacity between the drain electrode and the source electrode or between the drain electrode and the gate electrode increases.

In such a condition, when a so-called pulse lighting type that periodically repeats lights-up and lights-out is applied for the backlight, a leakage performance and/or a parasitic capacity vary between on-state and off-state of the backlight. Therefore, pixel potential and opposite electrode potential fluctuate with lighting condition of the backlight, and the fluctuation affects transmissivity of crystal liquid, causing to uneven picture or flicker.

SUMMARY OF THE INVENTION

The present invention has been accomplished to solve the above problem, and an object of the present invention is thus to suppress the growth of leakage current due to lights from a backlight in a semiconductor layer formed below a source line and so on in a display apparatus of a bottom-gate type and so on, thereby increasing picture quality of the display apparatus.

A first display apparatus according to the present invention is a display apparatus having a gate line which drives a pixel electrode constituting pixels on an insulating substrate; a source line which intersects with the gate line with an insulating film in between; a source electrode which is connected to the source line; a drain electrode which is located opposite to the source electrode above a gate electrode connected to the gate line, and which is connected to the pixel electrode; a semiconductor layer which is formed below the source electrode, the source line, and the drain electrode; a light-shielding pattern which is configured below the semiconductor layer lying below the source line; and a backlight which emits lights from a light source to strike the surface at the insulating substrate opposite to where pixels are formed.

A second display apparatus according to the present invention is the first display apparatus, wherein the light-shielding pattern is configured in a region outside of a crossing point of the gate line and the source line.

A third display apparatus according to the present invention is the first display apparatus, wherein the drain electrode further has an extending pattern which is configured not above the gate electrode nor above the gate line and which is connected to the pixel electrode; and the light-shielding pattern is configured not below the source line but below the semiconductor layer lying below a part or all of a region of the extending pattern of the drain electrode.

A fourth display apparatus according to the present invention is the first display apparatus; wherein the drain electrode further has an extending pattern which is configured not above the gate electrode nor above the gate line and which is connected to the pixel electrode; and the light-shielding pattern is configured below the semiconductor layer lying below the source line and the extending pattern of the drain electrode.

A fifth display apparatus according to the present invention is one of the second, third, or fourth display apparatus, wherein the light-shielding pattern is configured in the same layer of a conductive film as the gate line.

A sixth display apparatus according to the present invention is the third or fourth display apparatus, wherein an connecting pattern which connects the drain electrode with a connection between the extending pattern of the drain electrode and the pixel electrode is configured narrower than the channel width of a thin film transistor which is configured from the gate electrode, the insulating film, the source electrode, the drain electrode, and the semiconductor layer.

A seventh display apparatus according to the present invention is a display apparatus having a gate line which drives a pixel electrode constituting pixels on an insulating substrate; a source line which intersects with the gate line with an insulating film in between; a source electrode which is connected to the source line; a drain electrode which is located opposite to the source electrode above a gate electrode connected to the gate line, and which is connected to the pixel electrode; an extending pattern above the drain electrode which is configured not above the gate electrode nor above the gate line, and which is connected to the pixel electrode; a semiconductor layer which is formed below the source electrode, the source line, the drain electrode, and the extending pattern of the drain electrode; a thin film transistor which is configured from the gate electrode, the insulating film, the source line, the drain electrode, and the semiconductor layer; a backlight which emits lights from a light source to strike the surface of the insulating substrate opposite to where pixels are formed; and a connecting pattern which connects the drain electrode with a connection between the extending pattern of the drain electrode and the pixel electrode, and which is configured narrower than the channel width of the thin film transistor.

A eighth display apparatus according to the present invention is the seventh display apparatus further having a light-shielding pattern which is configured below the semiconductor layer lying below the source line.

A ninth display apparatus according to the present invention is the seventh or eighth display apparatus further having a light-shielding pattern which is configured below the semiconductor layer lying below the connecting pattern in the extending pattern of the drain electrode.

A tenth display apparatus according to the present invention is the eighth or ninth display apparatus, wherein the light-shielding pattern is configured in the same layer of a conductive film as the gate line.

An eleventh display apparatus according to the present invention is a display apparatus having a gate line which drives a pixel electrode constituting pixels on an insulating substrate; a source line which intersects with the gate line with an insulating film in between; a drain electrode which is connected to the pixel electrode; a source electrode which is located opposite to the drain electrode above a gate electrode connected to the gate line, and which is formed independently of the source line; a semiconductor layer which is formed below the drain electrode and also formed independently below the source line and below the source electrode; an extending pattern which is configured above the drain electrode but not above the gate electrode nor above the gate line, and which is connected to the pixel electrode; a connecting pattern which connects the source line with the source electrode and which is configured in a different layer of a conductive film from the source line or the source electrode; and a backlight which emits lights from a light source to strike the surface of the insulating substrate opposite to where pixels are formed.

A twelfth display apparatus according to the present invention is the eleventh display apparatus further having a light-shielding pattern which is configured below the semiconductor layer lying below the extending pattern of the drain electrode.

A thirteenth display apparatus according to the present invention is the eleventh or twelfth display apparatus, wherein the connecting pattern is configured in the same layer of a conductive film as the pixel electrode.

A fourteenth display apparatus according to the present invention is one of the eleventh, twelfth, or thirteenth display apparatus, wherein the connecting pattern is configured to extend to the direction of the source line as crossing over the gate line, at a crossing point of the gate line and the source line.

A fifteenth display apparatus according to the present invention is one of the eleventh to fourteenth display apparatus, wherein the light-shielding pattern is configured in the same layer of a conductive film as the gate line. The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
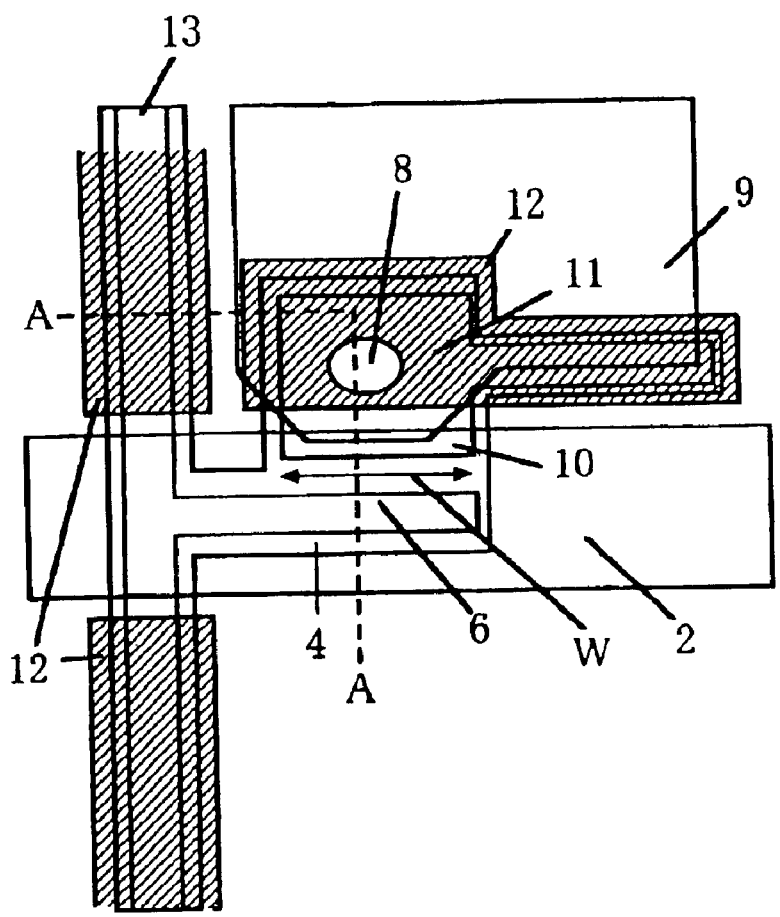
FIG. 1 is a plan view of a display apparatus according to a first embodiment of the present invention.
Figure 2:
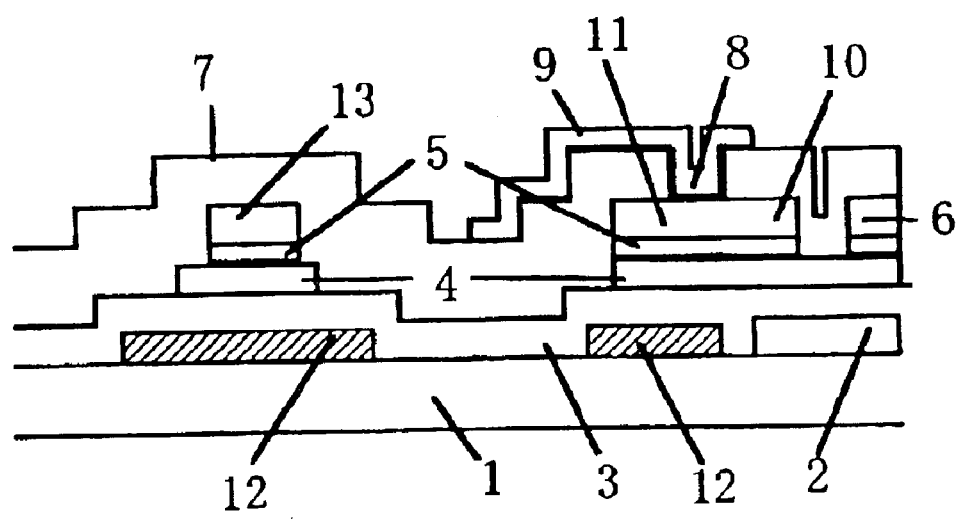
FIG. 2 is a cross-sectional view along line A—A in FIG. 1.

A first embodiment of the present invention will be described with reference to FIG. 1 and FIG. 2. FIG. 1 is a plan view of an array substrate of a display apparatus according to the first embodiment of the present invention, and FIG. 2 is a cross-sectional view along line A—A in FIG. 1. In FIG. 1 and FIG. 2, a reference symbol 1 denotes an insulating substrate, 2 denotes a gate line, 3 denotes a gate insulating film, 4 denotes a non-doped semiconductor layer, 5 denotes an ohmic contact layer, 6 denotes a source line, 7 denotes a passivation film which is an overcoating insulating film, 8 denotes a contact hole, 9 denotes a pixel electrode, 10 denotes a drain electrode, 11 denotes an extending pattern of the drain electrode, 12 denotes a light-shielding pattern configured in the same manufacturing step as the gate line 2, 13 denotes a source line, and W denotes a channel width of a transistor.

In the following, a method of manufacturing a display apparatus according to the first embodiment of the present invention will be explained with reference to FIG. 1 and FIG. 2. In the first place, a first conductive film is deposited on the insulating substrate 1. For the first conductive film, Al, Cu, Ta, Mo, or a thin film composed of an alloy that other substances are added to those and so on, for example, is used. Next, by patterning of the first conductive film in photoengraving processes, the gate line 2 is formed. At the same time, the light-shielding pattern 12 to shield lights from the semiconductor layer 4 lying below the source line 13 and the extending pattern 11 of the drain electrode is formed. As shown in FIG. 1, the light-shielding pattern 12 which is formed below the semiconductor layer 4 lying below the source line 13 is configured in the region outside of a crossing point of the source line 13 and the gate line 2, and the light-shielding pattern 12 which is formed below the semiconductor layer 4 lying below the extending pattern 11 of the drain electrode is configured in almost all the region outside of a gate electrode or the gate line 2. In addition, since lights from a backlight come into a space between the gate line 2 and the light-shielding pattern 12, the space is preferably as narrow as possible in order to reduce leakage current. Though a space of the narrowest width (usually about 3 µm) is left because of limits of resolution and processing accuracy in photoengraving, leakage current decreases compared to the case where the light-shielding pattern 12 is not mounted, which enables to improve picture quality.

Then, a first insulating film of the gate insulating film 3, the semiconductor layer 4, and the ohmic contact layer 5 are formed successively, using a film deposition system such as plasma CVD, for example. For the first insulating film used as the gate insulating film 3, SiNx, SiOx, SiOxNy, or a lamination film of those is used. For the semiconductor layer 4, amorphous silicon (i-a-Si) or poly-silicon (i-p-Si) is used. For the ohmic contact layer 5, n-a-Si or n-p-Si, in which a small amount of phosphorus (P) and the like are doped to a-Si film or p-Si film, is used. Then, after patterning the semiconductor layer 4 and the ohmic contact layer 5 by photoengraving processes, those layers are etched by the technique of dry etching, for example, to form a channel and a semiconductor layer pattern 4 and 5.

In the next place, a second conductive film is deposited. As the second conductive film, a thin film composed of Cr, Mo, Ta, Al or an alloy etc. in which a small amount of other substances are added to those, a laminate of dissimilar metal films, or a film with a different composition along the thickness, is used. By patterning of the second conductive film in photoengraving processes, the source line 13, the source electrode 6, and the drain electrode 10 are formed. At the same time, the extending pattern 11 which is connected with the pixel electrode 9 which will be formed later is formed above the drain electrode 10 but not above the gate electrode nor above the gate line 2.

Next, the passivation film 7 which is a second insulating film is deposited, using a film deposition system such as plasma CVD, for example. Then, the contact hole 8 is formed in the gate insulating film 3 or in the passivation film 7 by photoengraving processes and dry etching and so on.

Further, a third conductive film is deposited by spattering, for example. For the third conductive film, a transparent conductive film such as ITO is used. In the processes of photoengraving and etching on the third conductive film, the pixel electrode 9 is formed.

As in the foregoing, according to the above embodiment, in a display apparatus of a bottom-gate type and so on, it is feasible to decrease leakage current arising because of lights from a backlight striking the semiconductor layer 4 below the source line 13 or the extending pattern 11 of the drain electrode through the surface of the insulating substrate opposite to where pixels are formed, thereby preventing uneven brightness and reduced contrast to increase picture quality. Also, fluctuation of a parasitic capacity between the pixel electrode 9 (the drain electrode 10) and the gate electrode, and between the pixel electrode 9 (the drain electrode 10) and the source line 13, arising because of the lighting condition of on-state or off-state of the backlight can be eliminated. Because of the above-mentioned effects, the picture quality of the display apparatus can be improved. Though the present embodiment describes a case where the light-shielding pattern is configured below both of the source line 13 and the extending pattern 11 of the drain electrode, it can be either one. For example, when picture problems are caused by leakage current from the semiconductor layer 4 below the extending pattern 11 of the drain electrode, the light-shielding pattern 12 can be formed only below the extending pattern 11 of the drain electrode; on the other hand, when picture problems are caused by leakage current from the semiconductor layer 4 below the source line 13, the light-shielding pattern 12 can be formed only below the source line 13.

While, the light-shielding pattern 12 is configured in the same layer of a conductive film as the gate line 2 in the above-mentioned processes, it can be formed in the different manufacturing step from the gate line 2. In this case, a light-shielding film is formed before or after forming the gate line 2, and the light-shielding pattern 12 of the semiconductor layer 4 lying below the source line 13 or below the pattern 11 which extends from the drain electrode 10 is configured by patterning. Further, a configuration where the light-shielding pattern 12 and the gate line 2 pattern have an insulating film in between is also possible while it needs another manufacturing step. In this configuration, when the light-shielding pattern 12 is formed in the same step as the gate line 2 and the gate electrode, the narrowest space between those patterns which is determined by resolution in photoengraving processes can become still narrower, thereby reducing the amount of lights from the backlight to strike the semiconductor layer 4. In addition, in the configuration where the insulating film lies between the light-shielding pattern 12 and the gate line 2 pattern, the light-shielding pattern 12 can be slightly overlapped with the gate electrode and the gate line 2. Therefore, lights entering through the space between those patterns can be eliminated or become very little, thereby enhancing the effect of lowering the leakage current.

Also, in the present embodiment, since the light-shielding pattern 12 is formed in a floating condition that is not electrically connected with, or insulated from, another conductive film and so on, the picture problems don't occur even when the light-shielding pattern 12 and another conductive film are short-circuited due to contaminants produced during manufacturing processes and the like; further, the growth of loads on the source line 13 and the gate line 2 can be suppressed, which maintains the picture quality.

Furthermore, in the above processes, it is also possible to carry out exposure and development of photoengraving processes and etching processes after depositing the gate insulating layer 3 being the first insulating layer, the non-doped semiconductor layer 4, and the doping semiconductor layer being the ohmic contact layer 5, and further successively depositing conductive layers 6, 10, 11, and 13, which are Cr and Al, for example. In this way, formation of the source line 13, the source electrode 6 of the TFT, and the drain electrode 10 pattern, and formation of the semiconductor layer 4 pattern below those patterns can be done in one photoengraving process to decrease mask steps. In the array substrate formed in this procedure, the semiconductor layer 4 lies in nearly all the region below the conductive layer having the source line 13, the source electrode 6, and the drain electrode 10; therefore, the same effect can be obtained according to the present embodiment.

Figure 3:
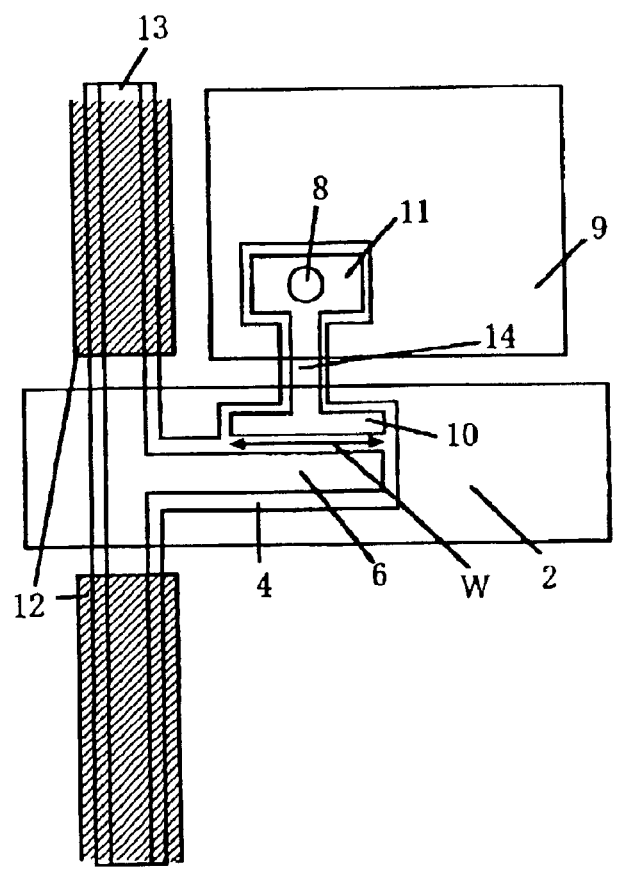
FIG. 3 is a plan view of a display apparatus according to a second embodiment of the present invention.

A second embodiment of the present invention will be described with reference to FIG. 3. FIG. 3 is a plan view of an array substrate of a display apparatus according to the second embodiment of the present invention. In FIG. 3, the same elements as in the FIG. 1 and FIG. 2 are denoted by the same reference symbols, and the reference symbol 14 denotes a connecting pattern in the extending pattern of the drain electrode. As shown in FIG. 3, the connecting pattern 14 which connects the drain electrode 10 with a connection between the extending pattern 11 of the drain electrode and the pixel electrode 9 is configured to be narrower than the channel width W of the transistor, and the semiconductor layer 4 lying below the connecting pattern 14 is also configured to be narrower than the channel width W of the transistor. Since the manufacturing processes according to the present embodiment is the same as that according to the first embodiment, explanation will be omitted here.

In this configuration, a region where a carrier is developed due to lights from the backlight can become narrow to decrease leakage current, thereby eliminating the need for the light-shielding pattern 12 to be configured below the extending pattern 11 of the drain electrode. Therefore, an electrical short-circuit of the light-shielding pattern 12 and the gate line 2 doesn't occur, thus no effect is exerted on the manufacturing yield. Though the FIG. 3 shows a case where the light-shielding pattern 12 is formed below the source line 13, the light-shielding pattern 12 can be eliminated when leakage current from the semiconductor layer 4 below the source line 13 has only a little effect. Also, while the present embodiment describes a case where the light-shielding pattern 12 is configured in the same layer of a conductive film as the gate line 2, it can be configured in the different manufacturing step from, which is, in a different layer of a conductive film from, the gate line 2 as is the first embodiment.

Figure 4:
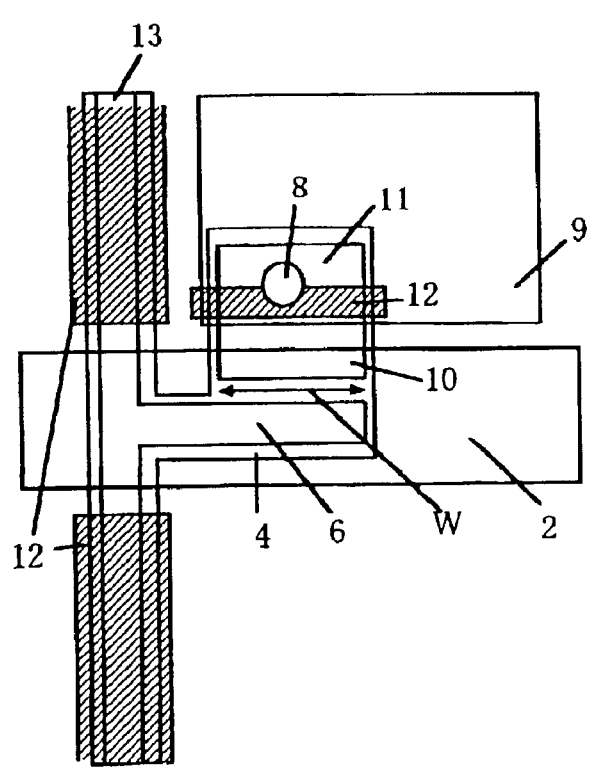
FIG. 4 is a plan view of a display apparatus according to a third embodiment of the present invention.
Figure 5:
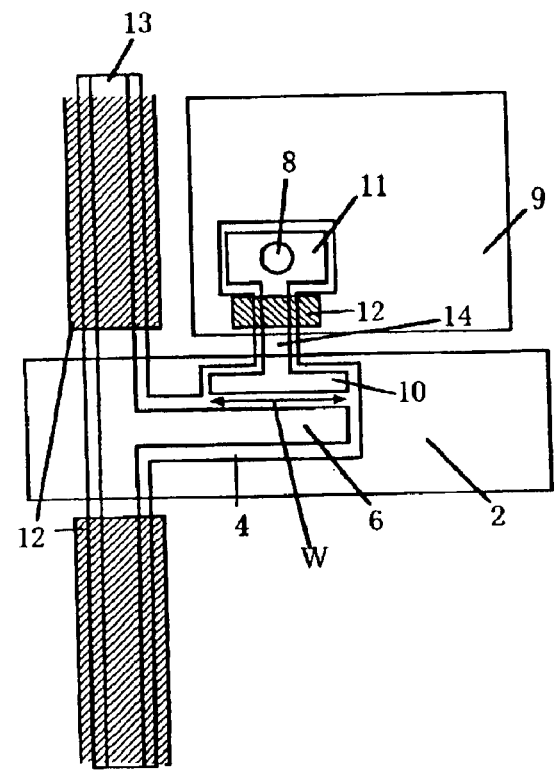
FIG. 5 is another plan view of a display apparatus according to the third embodiment of the present invention.

A third embodiment of the present invention will be described with reference to FIG. 4 and FIG. 5. FIG. 4 is a plan view of an array substrate of a display apparatus, and FIG. 5 is another plan view of an array substrate of a display apparatus, both according to the third embodiment of the present invention. In FIG. 4 and FIG. 5, the same elements as in the FIGS. 1 to 3 are denoted by the same reference symbols, and the differences will be explained hereinbelow. The first embodiment describes a case where the light-shielding pattern 12 is formed in almost all the region of the semiconductor layer 4 below the source line 13 and the extending pattern 11 of the drain electrode, but not above the gate electrode or the gate line 2. In the present embodiment, as shown in FIG. 4, the light-shielding pattern 12 is configured in a part near the gate electrode or the gate line 2 in the extending pattern 11 of the drain electrode. Since the manufacturing processes according to the present embodiment is the same as that according to the first embodiment, explanation will be omitted here.

When the light-shielding pattern 12 is configured in a part near the gate electrode or the gate line 2 in the extending pattern 11 of the drain electrode like the present embodiment, no carrier is developed in the semiconductor layer 4 of that region. Therefore, the region becomes highly resistant, and a leak passage between the pixel electrode 9 and the source line 13 at the time of retention is cut in this region, thereby decreasing light leakage current to improve a retention performance. The improvement becomes more effective when the light-shielding pattern 12 is formed in the different layer of a conductive film from the gate line 2.

Further, when the light-shielding pattern 12 and the gate line 2 are formed at one time, a case sometimes occurs where the gate line 2 or the gate electrode comes into contact with the light-shielding pattern 12 due to poor patterning; however, according to the present embodiment, increase in a parasitic capacity (an overlapping capacity) between the gate electrode and the drain electrode 10 which is generated at this time can be minimized. Accordingly, the effect on the pixel electrode becomes as small as not being perceived, or perceived in a very low level, as point defects. The above advantage becomes more significant when the connecting pattern 14 which connects the drain electrode 10 with a connection between the extending pattern 11 of the drain electrode and the pixel electrode 9 is configured to be narrower than the channel width W of the transistor, as described in the above-mentioned second embodiment. That is, as shown in FIG. 5, the light-shielding pattern 12 can be smaller. Therefore, increase in a capacity between the gate electrode and the drain electrode 10 which is generated when the light-shielding pattern 12 comes into contact with the gate line 2 is more significantly suppressed, thereby further reducing the effect on the manufacturing yield.

While the FIG. 4 and FIG. 5 show a case where the light-shielding pattern 12 is configured below the source line 13 also, the light-shielding pattern 12 in that part can be eliminated when leakage current from the semiconductor layer 4 lying below the source line 13 has only a little effect.

Figure 6:
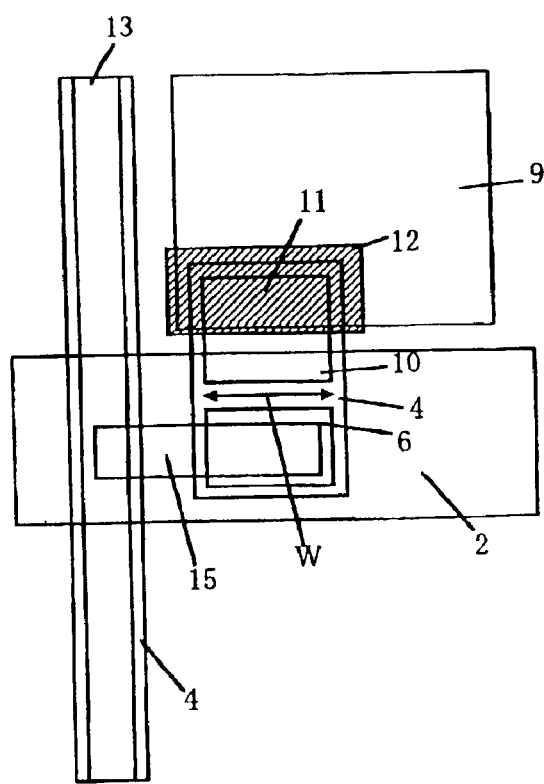
FIG. 6 is a plan view of a display apparatus according to a fourth embodiment of the present invention.
Figure 7:
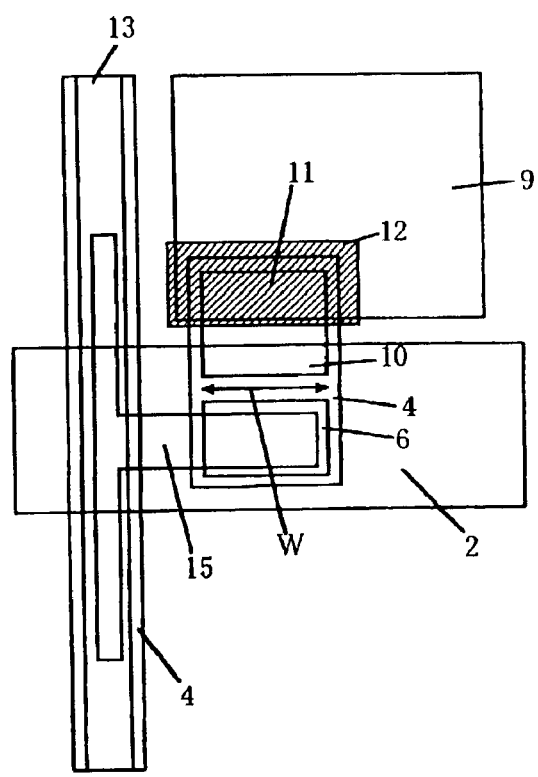
FIG. 7 is another plan view of a display apparatus according to the fourth embodiment of the present invention.

A fourth embodiment of the present invention will be described with reference to FIG. 6 and FIG. 7. FIG. 6 is a plan view of an array substrate of a display apparatus, and FIG. 7 is another plan view of an array substrate of a display apparatus, both according to the fourth embodiment of the present invention. In FIG. 6 and FIG. 7, the same elements as in the FIG. 1 to FIG. 5 are denoted by the same reference symbols, and the reference symbol 15 denotes a connecting pattern.

In the following, a method of manufacturing an array substrate of a display apparatus according to the present embodiment will be explained with reference to FIG. 6. After the gate electrode and the gate line 2 are formed in a first conductive film, a first insulating film of the gate insulating film 3, the semiconductor layer 4, the ohmic contact layer 5, and a second conductive film are successively deposited, and then the source line 13, an electrode of the TFT, and the semiconductor layer 4 lying below those are patterned in one photoengraving process. Here, the source line 13 and the TFT section (the source electrode 6) are formed independently of, or separately from, each other. Then, a third conductive layer is deposited. The pixel electrode 9 is formed by the processes of photoengraving and etching on the third conductive film; at the same time, the connecting pattern 15 which connects the source line 13 with the source electrode 6 is configured.

As explained in the foregoing, according to the present embodiment, even in a configuration where the semiconductor layer 4 lies below a pattern above which the source line 13, the source electrode 6, and the drain electrode 10 are formed, the need for the light-shielding pattern 12 below the source line 13 can be eliminated when the semiconductor layer 4 below the source line 13 and that below the TFT section (the source electrode 6) are formed independently of, or separately from, each other. Therefore, deterioration of a retention performance caused by lights coming from the backlight can be prevented. Also, when the connecting pattern 15 is configured to extend to the direction of the source line 13 as crossing over the gate line 2, at a crossing point of the gate line 2 and the source line 13 as shown in FIG. 7, it works as a repairing pattern of breaking of the source line 13 which is likely to occur at the crossing point.

In the foregoing, while the present embodiment describes a case where the connecting pattern 15 is configured right after the formation of the source line 13, the source electrode 6, and the drain electrode 10 pattern, the same effect can be obtained in a configuration where the passivation film 7 (an insulating film) lies between the connecting pattern 15 and the source line 13, the source electrode 6 and the drain electrode 10 pattern, having a contact hole in the insulating film as a continuity for the both. Also, the connecting pattern 15 can also be used as a repairing pattern of the source line 13 when the source line 13 and the connecting pattern 15 are connected by laser irradiation to a section where the connecting pattern 15 is configured to extend to the direction of the source line 13 as crossing over the gate line 2, as in FIG. 7. Further, the need for the light-shielding pattern below the source line 13 is eliminated in the present embodiment, in case where picture problems caused by leakage current from the semiconductor layer 4 lying below the source line 13 still occur in this configuration, the light-shielding pattern 12 can be configured below the source line 13 as well. While the present embodiment describes a case where the connecting pattern 15 which connects the source line 13 with the source electrode 6 is configured in the same layer of a conductive film as the pixel electrode 9 as in the different layer of a conductive film from the source line 13 and the source line 6, it is not restricted thereto, and the connecting pattern 15 can be formed in a different manufacturing step from the gate line 2 or the pixel electrode 9 pattern. Also, while a case where the light-shielding pattern 12 is configured in the same layer of a conductive film as the gate line 2 is described in the present embodiment, it can be formed in a different manufacturing step from, which is, in a different layer of a conductive film from, the gate line 2 as is the first embodiment.

Further, the present embodiment explains a case where the light-shielding pattern 12 is configured below the extending pattern 11 of the drain electrode in FIG. 6 and FIG. 7; however, in a configuration where the pixel electrode 9 is not connected to the extending pattern 11 of the drain electrode in a connection on the pixel electrode 9, but it extends onto the drain electrode 10 located above the gate electrode and the gate line 2, to be connected with the drain electrode 10 above the gate electrode, the area of the extending pattern 11 of the drain electrode which is configured neither above the gate electrode nor above the gate line 2 and the area of the semiconductor layer 4 can be smaller; thus the need for the light-shielding pattern 12 below the extending pattern 11 of the drain electrode can be eliminated.

Figure 8:
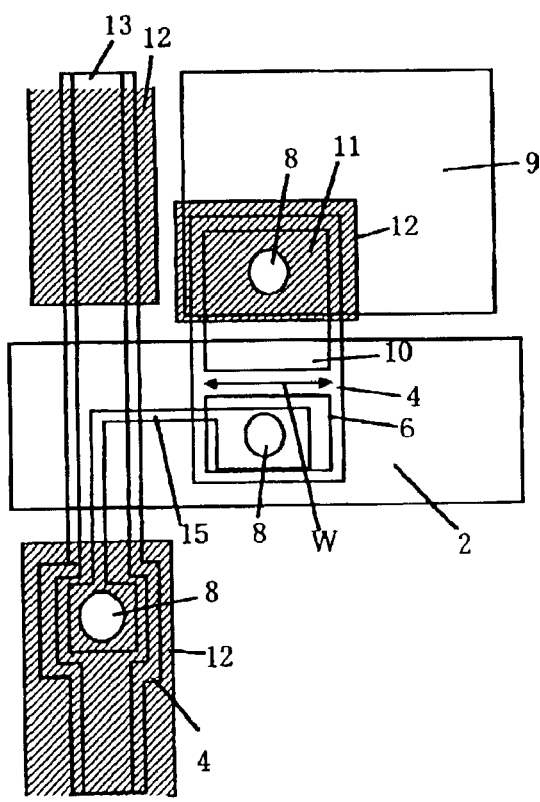
FIG. 8 is a plan view of a display apparatus according to a fifth embodiment of the present invention.

A fifth embodiment of the present invention will be described with reference to FIG. 8. FIG. 8 is a plan view of an array substrate of a display apparatus according to the fifth embodiment of the present invention. In FIG. 8, the same elements as in the FIGS. 1 to 7 are denoted by the same reference symbols, and the differences will be explained hereinbelow. In accordance with this embodiment, in order to enlarge the contact area of the source line 13 and the connecting pattern 15 for decreasing the contact resistance in the above-mentioned fourth embodiment, a part of the source line 13 pattern is extended from the source line 13. In this case, as shown in FIG. 8, a region where the source line 13 and the connecting pattern 15 come into contact with each other is arranged in a region outside of the gate line 2 or the gate electrode. When the diameter of a contact hole is enlarged, the area of the source line 13 pattern which is configured below the contact hole 8 is also enlarged; therefore, if the contact hole 8 is formed above the gate line 2, an overlapping capacity of the gate line 2 and the source line 13 increases, which leads to increase in a capacity of each line, and further to decrease in picture quality due to signaling delay. However, according to the present embodiment, the increase in an overlapping capacity can be suppressed, and the picture quality is less affected.

In this case, like the case in the fourth embodiment, the connecting pattern 15 can be used as a repairing pattern of breaking of the source line 13 by arranging a part of the connecting pattern 15 above the source line 13. While a case where the light-shielding pattern 12 is configured below the source line 13 also is described in the present embodiment, the light-shielding pattern 12 can be eliminated from below the source line 13 when leakage current from the semiconductor layer 4 lying below the source line 13 has no effect. Also, while a case where the light-shielding pattern 12 is formed in the same layer of a conductive film as the gate line 2 is described in the present embodiment, it can be formed in a different manufacturing step from, which is, in a different layer of a conductive film from, the gate line 2 as is the first embodiment.

Figure 9:
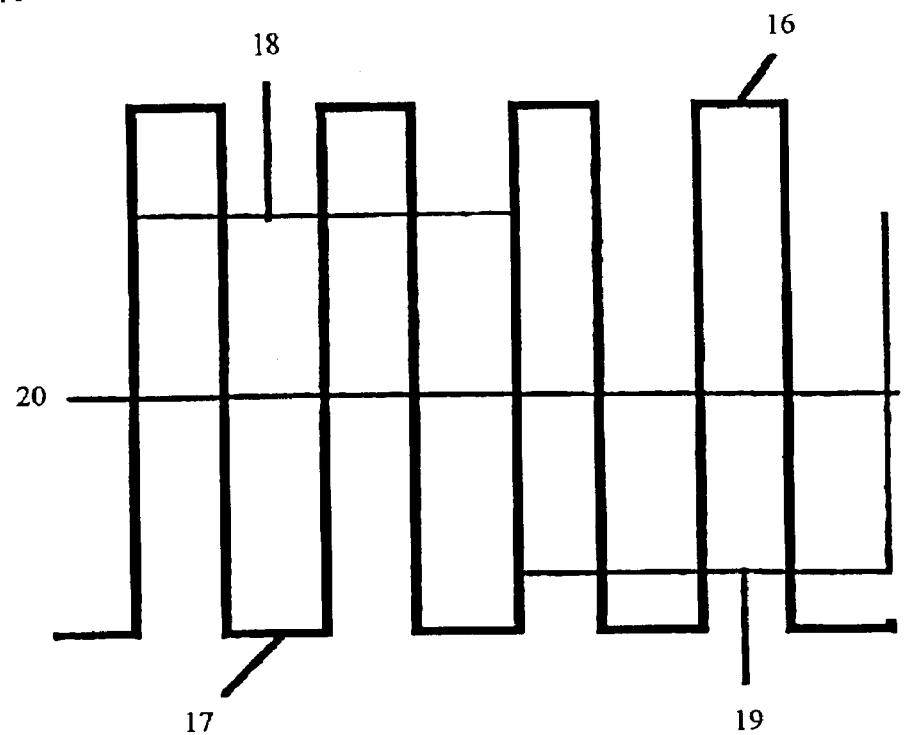
FIG. 9 is a waveform chart of an adjusted light from a backlight and a write voltage to liquid crystal in a display apparatus according to a sixth embodiment of the present invention.
Figure 10:
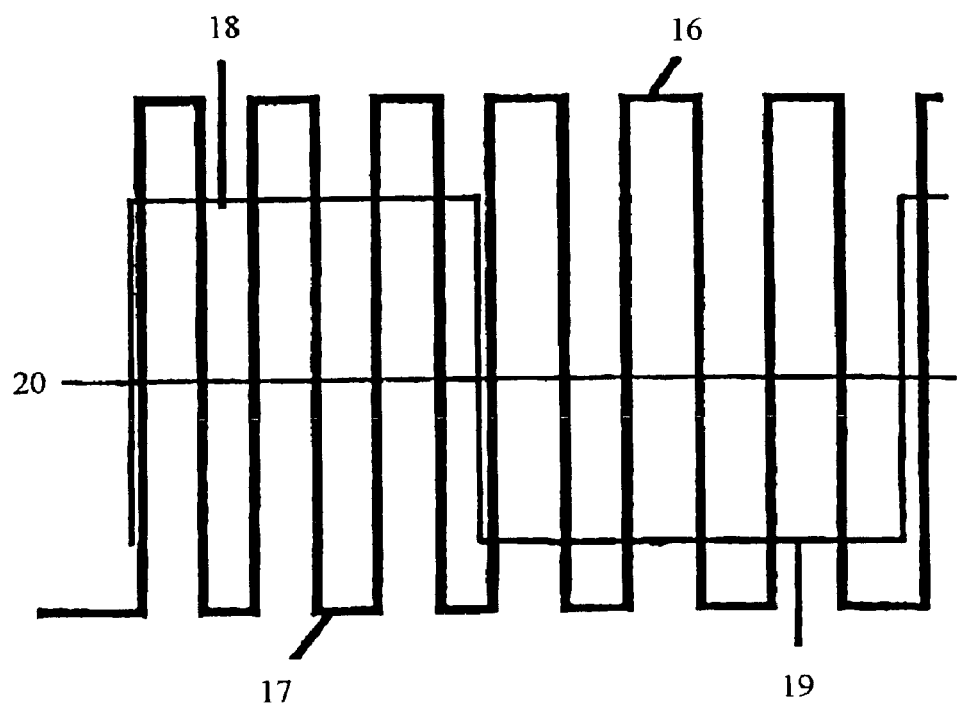
FIG. 10 is another waveform chart of an adjusted light from a backlight and a write voltage to liquid crystal in a display apparatus according to the sixth embodiment of the present invention.
Figure 11:
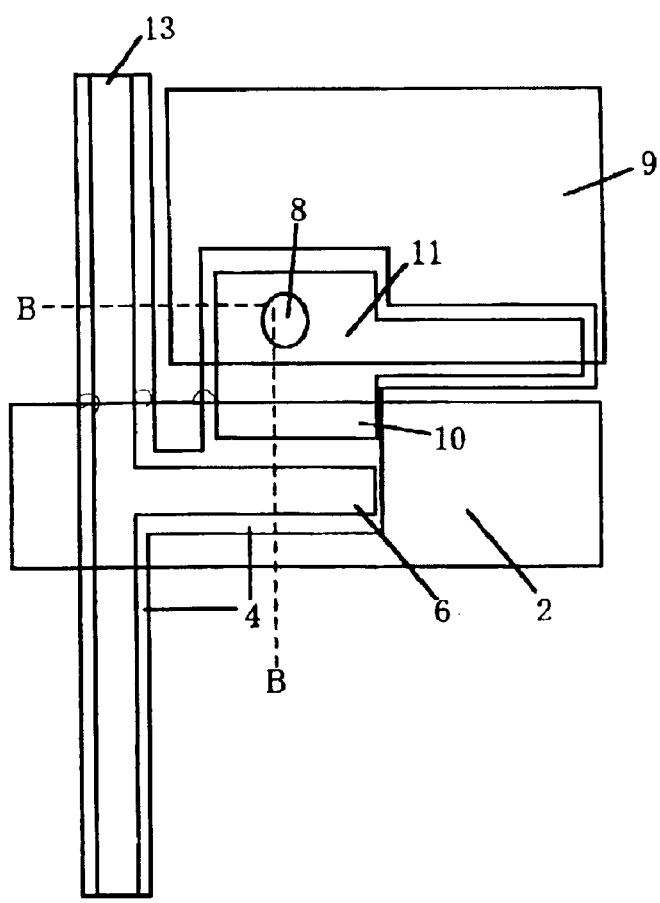
FIG. 11 is a plan view of a conventional liquid crystal display apparatus.
Figure 12:
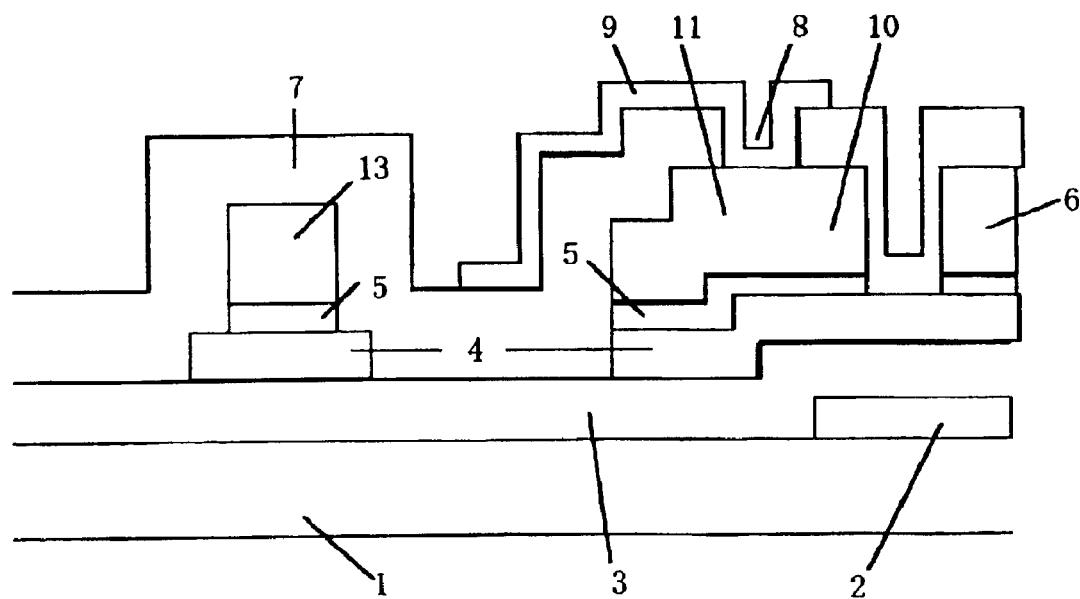
FIG. 12 is a cross-sectional view along line B—B in FIG. 11.
Figure 13A:
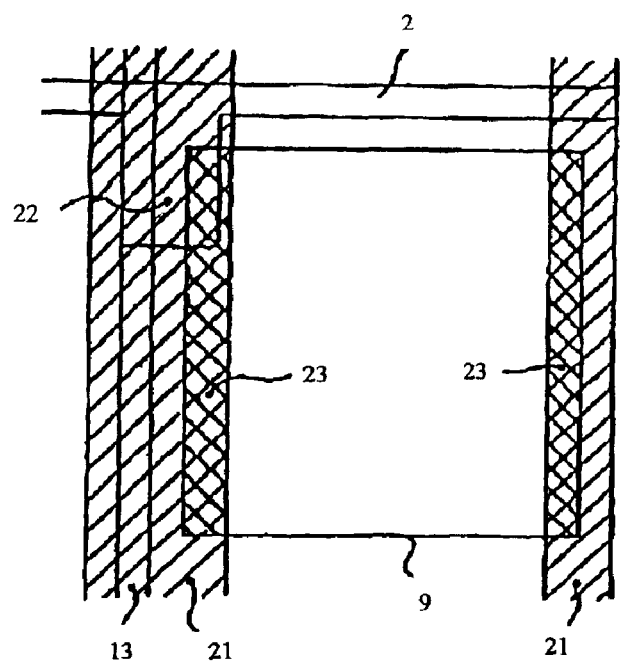
FIG. 13A is a plan view of a conventional liquid crystal display apparatus.
Figure 13B:
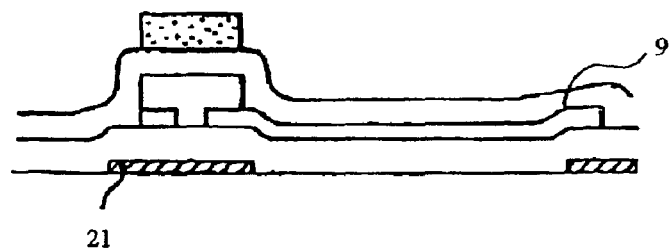
FIG. 13B is a sectional view of the same.
Figure 14:
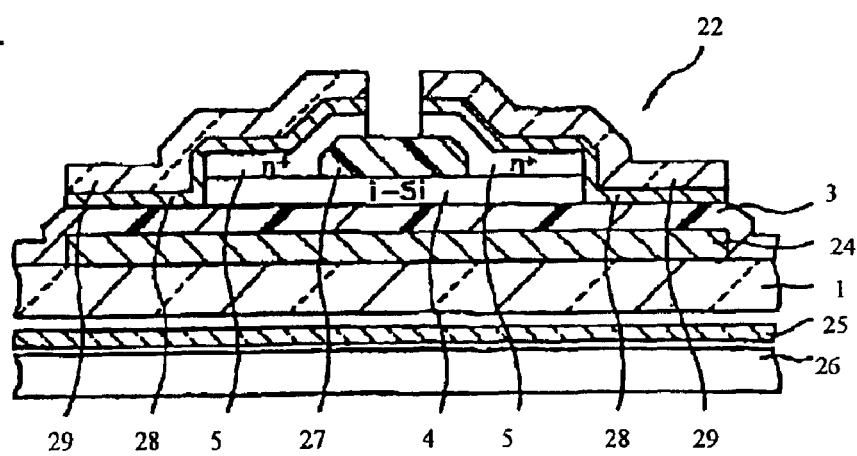
FIG. 14 is a sectional view of a conventional liquid crystal display apparatus.

A sixth embodiment of the present invention will be described with reference to FIG. 9 and FIG. 10. FIG. 9 is a waveform chart of an adjusted light from a backlight and a write voltage to liquid crystal in a display apparatus according to a sixth embodiment of the present invention. FIG. 10 is another waveform chart of an adjusted light from a backlight and a write voltage to liquid crystal in a display apparatus according to the sixth embodiment of the present invention. In FIG. 9 and FIG. 10, a reference symbol 16 denotes on-state of a backlight, 17 denotes off-state of the backlight, 18 denotes a write voltage to liquid crystal (a positive frame), 19 denotes a write voltage to liquid crystal (a negative frame), and 20 denotes a common electrode.

A display apparatus is driven by synchronizing a frequency of adjusted lights from the backlight (lights-up and lights-out) with a frequency of vertical signals as shown in FIG. 9. For example, at the time when writing to a first line of the gate line is started, the backlight is adjusted to light up. In this control, it is feasible to suppress uneven picture or flicker arisen due to interference of the frequencies of the adjusted lights from the backlight and that of the vertical signals.

Also, as shown in FIG. 10, a frequency of an adjusted light from the backlight is set to be at least 3 times (6 times in FIG. 10) higher than that of a rewrite voltage to liquid crystal (a vertical frequency and a frame frequency). Leakage current due to light irradiation from the backlight gradually increases right after lighting up the backlight until reaching a given value. Therefore, lighting times per lighting can be shortened by making the frequency of the backlight with on-state to be high (at least three times higher than that of a rewrite voltage to liquid crystal), and leakage current at the time of lighting can be decreased by turning the backlight off within the range of not increasing the leakage current. In this control, it is possible to solve picture problems such as uneven picture or flicker caused by leakage current.

The driving method according to the present embodiment can be used independently, or can be combined with a display apparatus according to the above-mentioned first to fifth embodiments. By combining the driving method with a display apparatus according to the first to fifth embodiment, uneven picture or flicker can be further suppressed to provide a display apparatus with a high picture quality.

Though the present invention is explained in detail in accordance with the above-mentioned first to six embodiments in the foregoing, the present invention is not restricted to have the layers configured in the same sequence as, or the same pattern arrangements as, the first to fifth embodiments, whereas it is applicable to any display apparatus having a configuration where lights emitted by a backlight come through the surface of an array substrate opposite to where pixels are formed, and a semiconductor layer is formed below a source line, a source electrode, or a drain electrode, as a matter of course.

Also, while the above-mentioned first to six embodiments describe the display apparatus using liquid crystal, the present invention is not limited to thereto, but is also applicable to display apparatus using electro luminescence element and so on as long as it is being a display apparatus having a configuration where lights emitted by a backlight come through the surface of an array substrate opposite to where pixels are formed, and a semiconductor layer is formed below a source line, a source electrode, or a drain electrode.

As explained in the foregoing, the present invention makes it possible to decrease leakage current which is increased because lights from a backlight come through the surface of an insulating substrate opposite to where pixels are formed onto a semiconductor layer lying below a source line or an extending pattern of a drain electrode in a display apparatus, thereby suppressing uneven brightness and reduced contrast to increase picture quality. Also, by suppressing increase in loads on a source line, a gate line and so on, uneven picture and flicker can also be suppressed to maintain picture quality.

From the invention thus described, it will be obvious that the embodiments of the invention can be varied in many ways. Such variations are not to be regarded as a departure from the spirit and scope of the invention, and all such modifications as would be obvious to one skilled in the art are intended for inclusion within the scope of the following claims.

What is claimed is:

1. A display apparatus comprising;
   a gate line driving a pixel electrode constituting pixels on an insulating substrate;
   a source line intersecting with said gate line with an insulating film in between;
   a source electrode connected to said source line;
   a drain electrode located opposite to said source electrode above a gate electrode connected to said gate line, and connected to said pixel electrode;
   a semiconductor layer formed below said source electrode, said source line, and said drain electrode;
   a light-shielding pattern configured below said semiconductor layer lying below said source line; and
   a backlight emitting lights from a light source to strike a surface of said insulating substrate opposite to where pixels are formed.

2. A display apparatus according to claim 1, wherein said light-shielding pattern is configured in a region outside of a crossing point of said gate line and said source line.

3. A display apparatus comprising:
   a gate line driving a pixel electrode constituting pixels on an insulating substrate;
   a source line intersecting with said gate line with an insulating film in between;
   a source electrode connected to said source line;
   a drain electrode located opposite to said source electrode above a gate electrode connected to said gate line, and connected to said pixel electrode;
   a semiconductor layer formed below said source electrode, said source line, and said drain electrode;
   a light-shielding pattern configured below said semiconductor layer lying below said source line; and
   a backlight emitting lights from a light source to strike a surface of said insulating substrate opposite to where pixels are formed,
   wherein said drain electrode further has an extending pattern which is configured not above said gate electrode nor above said gate line and which is connected to said pixel electrode, and said light-shielding pattern is configured not below said source line but below said semiconductor layer lying below a part or all of a region of said extending pattern of said drain electrode.

4. A display apparatus according to claim 1, wherein said drain electrode further has an extending pattern which is configured not above said gate electrode nor above said gate line and which is connected to said pixel electrode, and said light-shielding pattern is configured below said semiconductor layer lying below said source line and said extending pattern of said drain electrode.

5. A display apparatus according to claim 2, 3, or 4, wherein said light-shielding pattern is configured in the same layer of a conductive film as said gate line.

6. A display apparatus according to claim 3 or 4, wherein a connecting pattern, which connects a connection between said extending pattern of said drain electrode and said pixel electrode with said drain electrode, is configured narrower than a channel width of a thin film transistor which are configured from said gate electrode, an insulating film, said source electrode, said drain electrode, and said semiconductor layer.

7. A display apparatus according to claim 1, wherein said shielding pattern is disposed apart from a crossing point of said gate line and said source line.

8. A display apparatus according to claim 1, wherein said shielding pattern is formed in substantially all regions in which said semiconductor layer lies below said source line and is outside of said gate electrode and said gate line.

* * * * *